United States Patent [19]

Krogmann

[11] Patent Number: 4,688,347
[45] Date of Patent: Aug. 25, 1987

[54] FISHHOOK

[76] Inventor: William J. Krogmann, 274 Cedar Lake Ave., Round Lake, Ill. 60073

[21] Appl. No.: 794,655

[22] Filed: Nov. 4, 1985

[51] Int. Cl.⁴ ............................................. A01K 83/06
[52] U.S. Cl. ..................................... 43/44.8; 43/44.2
[58] Field of Search ..................... 43/42.29, 43.6, 44.2, 43/44.4, 44.6, 44.8, 44.82, 44.83, 44.87

[56] References Cited

U.S. PATENT DOCUMENTS

| | | | |
|---|---|---|---|
| 787,679 | 4/1905 | Koch | 43/44.2 |
| 979,891 | 12/1910 | Schield | 43/44.2 |
| 2,591,764 | 4/1952 | Allen | 43/44.2 |
| 2,825,174 | 3/1958 | Leinonen | 43/44.8 |
| 3,327,423 | 6/1967 | Kotis | 43/44.83 |
| 3,736,691 | 6/1973 | Gist | 43/44.8 |
| 4,471,558 | 9/1984 | Garcia | 43/44.8 |

Primary Examiner—M. Jordan
Attorney, Agent, or Firm—Victor F. Volk

[57] ABSTRACT

A fishhook has two other hooks rotatably and slidably mounted on its shank to hold a live bait fish.

9 Claims, 7 Drawing Figures

FISHHOOK

BACKGROUND OF THE INVENTION

When fishing with live bait such as minnows it is highly desirable, especially for still fishing as opposed to trawling, to have the head of the bait facing rearwardly, in proximity to the hook on which it is desired to catch a game fish. This follows from the fact that game fish tend to swallow their bait head first. It is also desirable to keep the bait fish alive as long as practicable and to have it move in a natural way. It is also desirable that, in biting into the bait the game fish should not be obstructed by the hook on which it is desired to ensnare him. For this purpose I have found that it is an advantage to have free relative rotation between the bait and the ensnaring hook so that the latter is free to slide into the game fish's mouth when he goes for the bait. While there have been prior suggestions for means of keeping bait fish alive these have tended to obstruct the natural movement of its fins or to be too cumbersome and complicated or both.

SUMMARY

I have invented a fishhook capable of holding a live bait fish with its head rearmost that comprises an elongated shank and a barbed, curved, game ensnaring extension of the shank. Slidably mounted on the shank and, preferably, rotatable around it, are a forwardly pointing and a rearwardly pointing hooking means, such as two additional fishhooks which may be rigidly attached to sleeves that surround the shank. The shank may comprise a stub portion that is integral with its barbed, game ensnaring extension, and also comprise means, such as a braze or weld or a crimped sleeve that connects the stub portion to the additional portion of the shank.

DETAILED DESCRIPTION OF PREFERRED EMBODIMENTS

Figure 1:
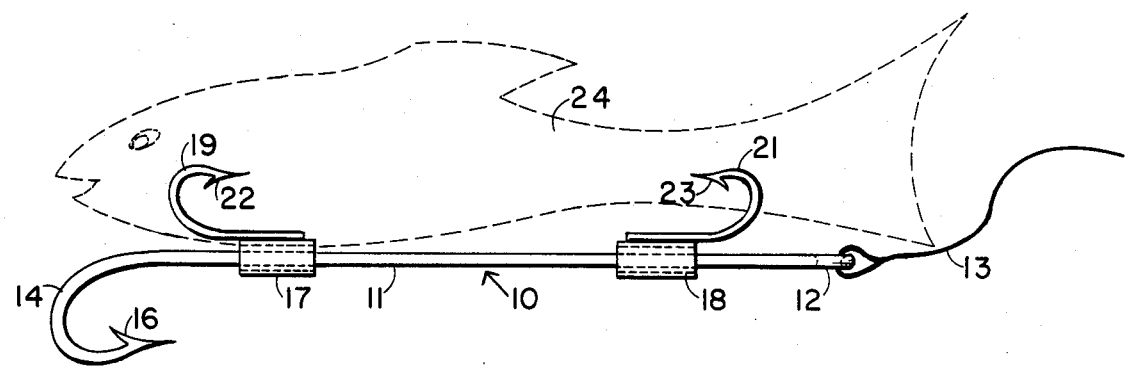
FIG. 1 shows a side view of the fishhook of my invention.
Figure 7:
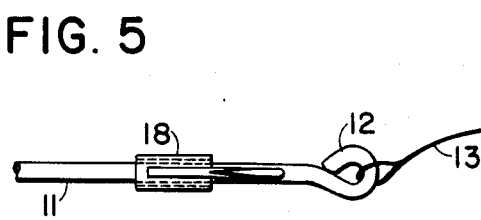
FIG. 7 shows a top view of the forward end of the fishhook of FIG. 1.

Referring first to FIG. 1 my fishhook, indicated generally by the numeral 10 has an inflexible shank 11 terminating in its forward end in an eyelet 12 in the usual manner. For the sake of clarity and consistency we shall refer herein to the end of the fishhook that is attached to the fish line as the forward end and to the opposite end as the rear. Thus a fish line 13 is seen connected through the eyelet 12. The fishhook 10 has a conventional curved rearmost end 14 with a barb 16, the end 14 being, as shown, an extension of the shank 11. Two sleeves 17, 18 enclose the shank 11 and are free to slide thereon, and two hooks 19, 21 with respective barbs 22, 23 are respectively brazed to the sleeves 17, 18 so that the hook 19 is pointed forwardly and the hook 21 is pointed rearwardly, as shown. A live minnow or other fish 24 is impaled on the hooks 19, 21. The sleeves 17, 18 and thus the hooks 19, 21 can not only slide lengthwise along the shank 11 but, importantly, can rotate freely around it. This permits the hooks to be inserted in fleshy areas of the fish 24 without damaging vital organs and without straining the structure of the fish to do it. It also permits rotation of the fishhook 10 and particularly its curved end 14 relative to the bait fish 24 when a game fish seizes the bait. The easy rotation of the fishhook 10 then permits it to enter the mouth of the game fish and ensnare it. The barbs 22, 23 (by the use of which term I refer, as is usual, to sharply pointed portions of the hook, close to its main point but directed in another, preferably opposite, direction) assure that the minnow will not escape and, indeed, afford additional means for ensnaring the game fish if it should attack from some other direction than the rear. As shown in FIG. 7 the enlarged eyelet 12 prevents the hooks 19, 21 from sliding off the leading end of the fishhook 10.

Figure 2:
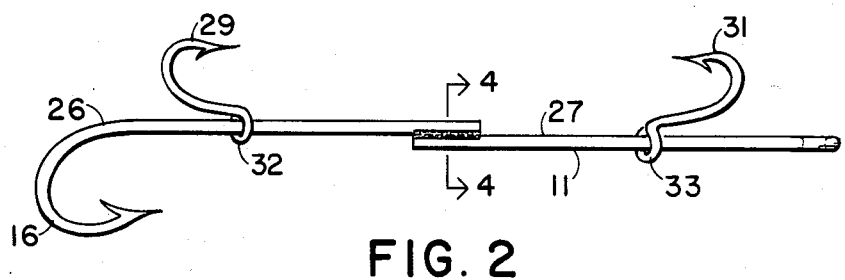
FIG. 2 shows a side view of another embodiment of the fishhook of my invention.

In FIG. 2 the shank 11 comprises a stub portion 26 connected at an overlapped area 27 to an additional shank portion 29 that includes the eyelet 12. The stub portion comprises the curved, barbed rearmost end 16. This structure permits the manufacture of my fishhook from the fore and rear portions of two conventional fishhooks that do not, individually, have long enough shanks. In FIG. 2, forwardly and rearwardly facing hooks 29, 31 are not mounted on sleeves but are attached to the shank by means of their eyelets 32, 33 which have been bent at right angles. This presents a more economical construction but it puts more strain on the minnow 24, the structure of which is now required to hold the hooks 29, 31 parallel to the shank 11.

Figure 3:
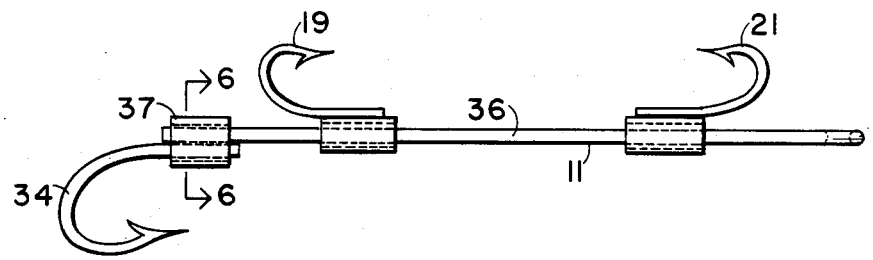
FIG. 3 shows a side view of still another embodiment of the fishhook of my invention.
Figure 4:
FIG. 4 shows a section through the line 4—4 of FIG. 2.
Figure 5:
FIG. 5 shows another embodiment of the section of FIG. 4.
Figure 6:
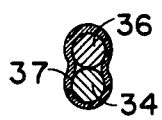
FIG. 6 shows a section through the line 6—6 of FIG. 3.

Whereas in FIG. 2 I have shown one of the hooks mounted on the stub portion 26 and the other on the additional portion 27 of the shank 11, in FIG. 3, a shorter stub portion 34 is connected to a longer additional portion 36 of the shank 11 and both slidable hooks are on the additional portion 36. In the embodiment of FIG. 3 the two portions of the shank are firmly connected by means of a heavy crimped sleeve 37 (see also FIG. 6). FIGS. 6 and 7 illustrate alternative methods, respectively, of brazing and welding together the portions 26 and 27 of the shank of the fishhook of FIG. 2.

In the practice of my invention the live bait fish 24 is pierced by the hook 19 (or 29) in a fleshy location that will not damage its gills or prevent movement of its fins and will bring its head in proximity to the curved extension 14 of the fishhook 10. The hook 21 (or 31) is then inserted in another fleshy location forward (on the fish but rearward on the fishhook) of the fish's caudal fin. Because the hooks 19 (or 29 and 21 (or 31) can slide on the shank my fishhook is adapted to bait fish of widely different sizes while retaining the ability to pierce these fish in the most harmless locations. In the water, because of the free rotation of the hooks 19, 21 the bait fish will maintain its body section vertical and continue in active movement. When there is a strike, the game fish will most likely be snared on at least one of the hooks 10, 19 or 21.

The foregoing description has been exemplary rather than definitive of my invention for which I desire an award of Letters Patent as defined in the following claims.

I claim:

1. A fishhook capable of holding a live bait fish with its head rearmost comprising:
   (A) an elongated inflexible shank,
   (B) a barbed, curved, game ensnaring integral extension of said shank,
   (C) a forwardly pointed hooking means mounted so as to slide and rotate freely on said shank, and,
   (D) a rearwardly pointed hooking means mounted so as to slide and rotate freely on said shank.

2. The fishhook of claim 1 wherein said slidably mounted forwardly pointed hooking means comprises a barb.

3. The fishhook of claim 1 wherein said slidably mounted rearwardly pointed hooking means comprises a barb.

4. The fishhook of claim 1 wherein said slidably mounted forwardly pointed hooking means comprises a barbed fishhook.

5. The fishhook of claim 1 wherein said slidably mounted rearwardly pointed hooking means comprises a barbed fishhook.

6. The fishhook of claim 1 wherein said shank comprises a stub portion integral with said barbed, game ensnaring, extension, and an additional portion, and means rigidly connecting together said stub and said additional portions of said shank.

7. The fishhook of claim 4 comprising sleeve means surrounding said shank and being rigidly attached to said forwardly pointed hooking means.

8. The fishhook of claim 5 comprising sleeve means surrounding said shank and being rigidly attached to said forwardly pointed hooking means.

9. The fishhook of claim 6 comprising two sleeve means surrounding said shank, said sleeve means being rigidly attached individually to each of said hooking means.

* * * * *